US006035352A

United States Patent [19]

Alonso et al.

[11] Patent Number: 6,035,352

[45] Date of Patent: Mar. 7, 2000

[54] COMPUTERIZED PAGER FOR STORING AND MANAGING INFORMATION

[75] Inventors: Israel Alonso, Hialeah; Donald E. Rhoades, Sunny Isles Beach; Jesus Sanchelima, Miami, all of Fla.

[73] Assignee: Donald Rhoades, Sunny Isles Beach, Fla.

[21] Appl. No.: 08/961,677

[22] Filed: Oct. 31, 1997

[51] Int. Cl.[7] .............................. G06F 13/00; G08B 5/22

[52] U.S. Cl. ........................ 710/100; 340/825.44; 710/52

[58] Field of Search .................................... 395/872, 280; 340/825.44, 825.47; 379/56.1, 78; 710/100, 52, 1; 709/213, 248; 713/400; 380/52

[56] References Cited

U.S. PATENT DOCUMENTS

| | | | |
|---|---|---|---|
| 5,043,721 | 8/1991 | May | 340/825.44 |
| 5,093,659 | 3/1992 | Yamada | 340/825.44 |
| 5,357,244 | 10/1994 | Zijl | 340/825.17 |
| 5,430,440 | 7/1995 | Shim | 340/825.44 |
| 5,475,380 | 12/1995 | Shim | 340/825.44 |
| 5,652,572 | 7/1997 | Kido et al. | 340/825.44 |

*Primary Examiner*—Gopal C. Ray
*Attorney, Agent, or Firm*—J. Sanchelima

[57] ABSTRACT

An information management device that is capable of efficiently using the different components that are required to perform information detection, recording and transmission that are necessary for a user with the efficient use of the limited memory resources available. Management of the memory resources permits a user to hold the information that he or she deems important for a predetermined amount of time. Preprogrammed profiles include one or more queries of different scope that are constantly compared to the information being received. If there are matches, predetermined blocks of information are transferred from a buffered section of the memory to a temporary section for additional processing, such as indexing. The device also includes a circuit for storing audio, receiving commercial broadcast signals, input devices such as a keyboard, an acoustic telephone dialer, an LCD display and alarms to alert the user that predetermined conditions are met. Cooperative software for synchronizing the data and instructions contained in the device with another computer system through serial or parallel ports is also provided.

9 Claims, 3 Drawing Sheets

COMPUTERIZED PAGER FOR STORING AND MANAGING INFORMATION

BACKGROUND OF THE INVENTION

1. Field of the Invention

The present invention relates to computerized pagers, and more particularly, to pagers that are capable of being readily customized by a user to meet his or her information needs.

2. Description of the Related Art

Applicant believes that the closest reference corresponds to a device marketed by Newton, Inc. under the MessagePad 2000 trademark. Basically, this computerized device includes most of the hardware features claimed herein except that it lacks a pager receiver and the means for dynamically "filtering" or "decanting" the stream of information being processed by the computerized pager. The present invention also includes means for the management of its limited memory resources and allows the user to create different levels of buffered storages with different sizes and holding times, depending on how close the information is to the targeted profile, or other considerations.

Also, the present invention provides the means for managing the voracious appetite for memory resources that is required to hold information and permits a user to discriminate or filter the information that is important allowing him or her to allocate more or less of these limited resources. For instance, if the user is a sales person traveling and there is a need for recording a voice note to himself or herself, then more memory may be allocated to the audio recorder circuit. In contrast, if the user is not traveling, or the circumstances do not warrant allocating the substantial amount of memory that is need for recording voice messages, then more memory resources can be made available for other functions, such as storage of filtered information from the pager receiver for one or more of the user's profiles.

The present invention provides a portable solution to the information access needs of the most active individual. Its interface capabilities with desktop computers enhances its computer capabilities.

No other devices known to applicant include the features claimed in the present application.

SUMMARY OF THE INVENTION

It is one of the main objects of the present invention to provide a computerized pager that is capable of dynamically filtering out information that meets a certain programmable profile and to selectively store it for predetermined periods of time depending on how close it is to the user's profile.

It is another object of this invention to provide a device that includes all the necessary functions to satisfy a user's needs for information, including telephone and address directory, dial-in/dial-out capability for transmitting and receiving data over the telephone network, audio recording and play back, calculator, receiver for AM and FM stations, as well as data from distributed cellular or paging stations or satellite transmission, games, interface with computer systems, alarms (visual and audio), battery status indicators and keyboard.

It is still another object of the present invention to provide a device wherein the different electronic functions are undertaken by efficiently sharing components.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
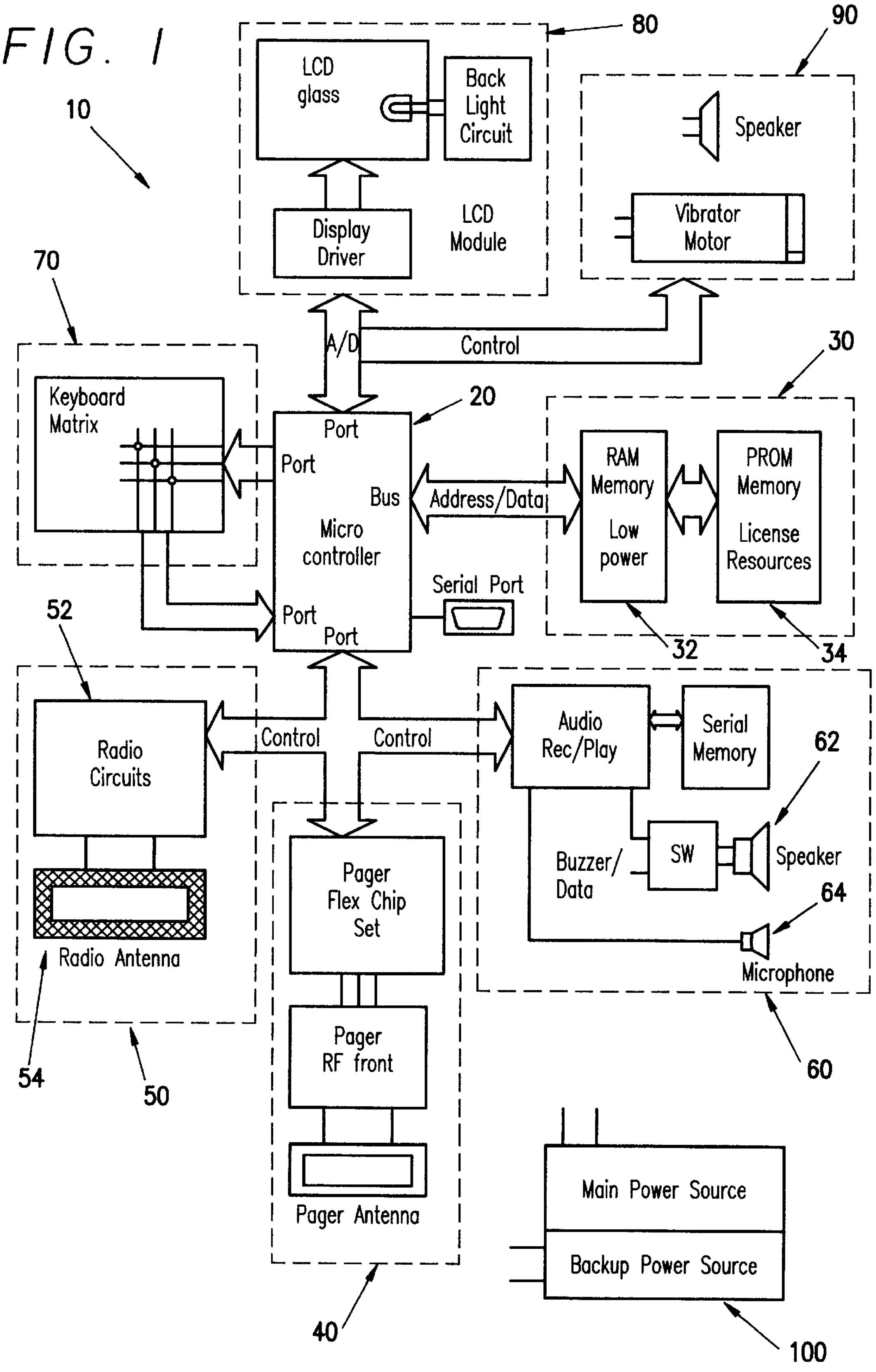
FIG. 1 is a block diagram representing the different circuit components included in the present invention.
Figure 2:
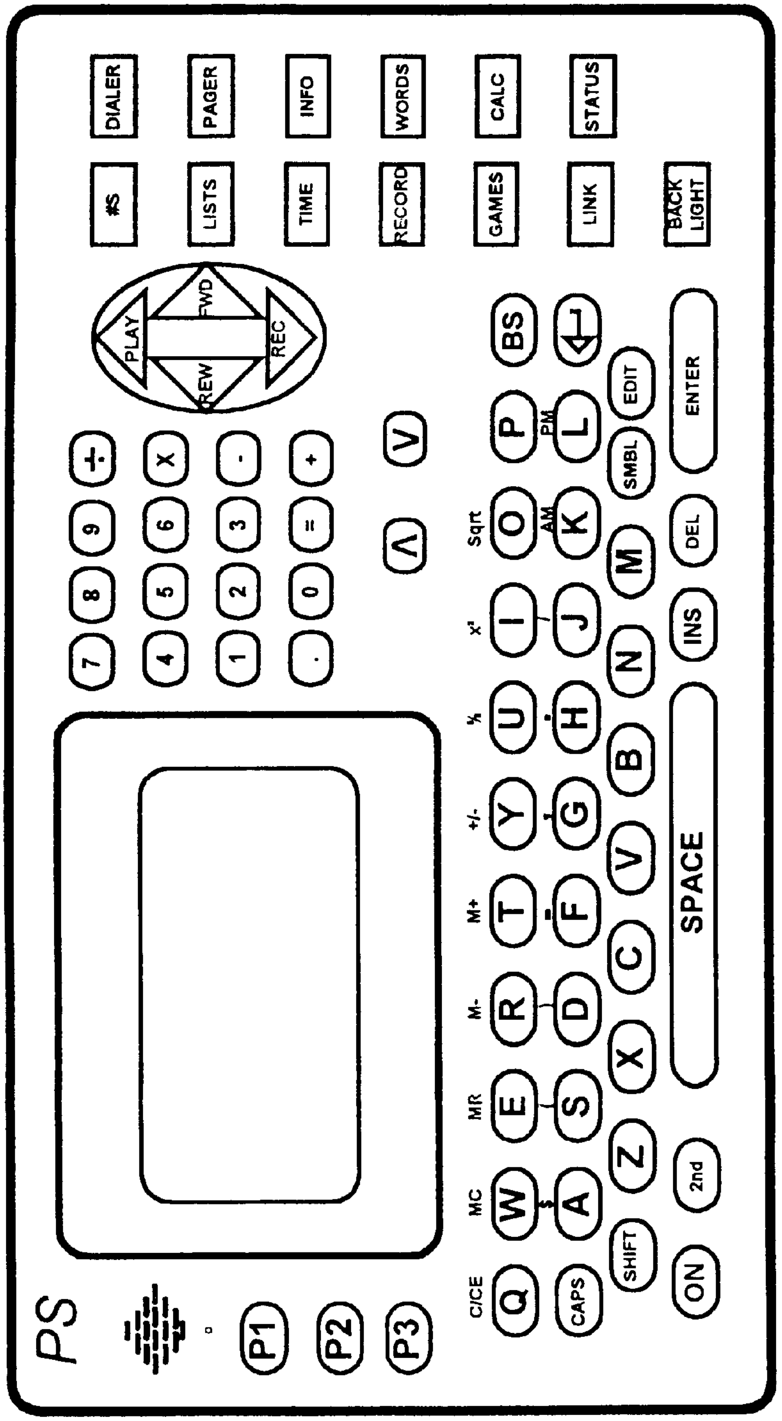
FIG. 2 shows one of the preferred embodiments for the present invention's housing, as seen from the outside.
Figure 3:
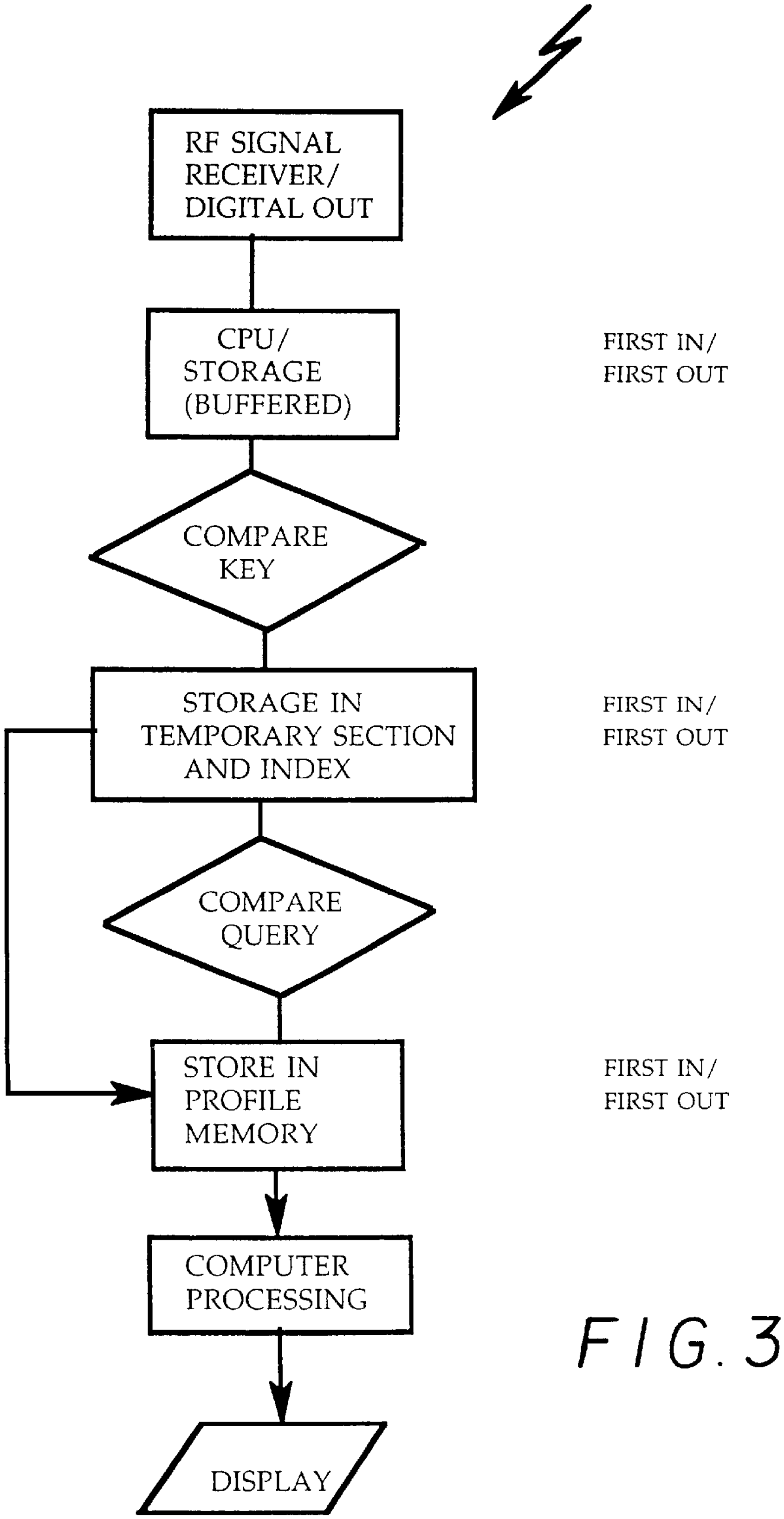
FIG. 3 is a condensed algorithm for the information storage processing.

Referring now to the drawings, where the present invention is generally referred to with numeral 10, it can be observed that it basically includes microprocessor circuit 20, memory circuit 30 linked through a cooperative data/address/instruction bus 32, pager circuit 40, radio broadcast circuit 50, audio recording circuit 60, keyboard input circuit 70, LCD display circuit 80, alarm circuit 90 and power supply circuit 100.

Microprocessor circuit 20 is cooperatively programmed with memory circuit 30 to store one or more data tables that contain the profile or profiles tailored to the users' interests. These profiles include keywords that will be combined with the necessary Boolean connectors to provide queries. Thus, for one profile you could have one or more queries. Query one (when more than one is used) will be broader than query number two. The profiles are used for different areas of interest, i.e., financial, music, sports, etc. The information received by pager circuit 40 is fed constantly to microprocessor circuit 20 and stored in a buffered portion of memory circuit 30. As the stream of information is being stored, the byte strings (typically ASCII encoded) are counted and compared to the keywords of each profile. If the byte strings match the keywords, they are indexed. After a predetermined block of information in the buffered portion of the memory is processed (counted, compared, and possibly indexed), the microprocessor circuit 20 is programmed to decide whether to store this block of information in a temporary memory section or not. The block will be stored in the temporary memory section if one or more of the keywords contained in the profiles is satisfied. If the block does not contain at least one of the keywords, then nothing is transferred to a temporary memory section and the buffered portion of the memory is available for the next block of information which writes over it.

In the preferred embodiment, there is one temporary memory section allocated for each profile. Therefore, if the preferred embodiment is built with capabilities for three profiles, i.e., profiles A, B, and C, then each will have its own temporary memory section. A user will be able to view, through an output device such as LCD display circuit 80, the latest blocks of information that contain one or more of the keywords included for that particular profile.

The blocks of information may include keywords that are included in more than one profile. In that case, the blocks of information will be stored in the respective temporary memory sections. When the temporary memory sections are filled, then the first block that was stored is pushed out (or written over) to permit new blocks that include at least one of the keywords in.

The blocks of information in the temporary memory sections are further processed by comparing the indexed keywords to the queries. Each profile has one or more queries. The keywords may be indexed in several ways. One of them contemplated by the inventors is to index them with respect to the beginning of the block of information. In this manner, Boolean connectors would include relative position connectors (i.e. Dolphins within 25 words of NFL). Once a block satisfies a query of one of the profiles it is transferred to a profile memory section where it stays for a predetermined amount of time or, if desired, is pushed out on a first-in, first-out basis. The amount of memory available will determine how much can be stored and also the nature of the query, the topic and the number of validated blocks of information.

In operation, a user could program a profile with the keywords: Football, Miami (within 3 words) Dolphin, NFL, score, Shula, corresponding to the first query. A second query with this profile can be programmed by eliminating keywords and thus making it broader. The second query will be used in the event that the first query yields no hits. The second (and subsequent broader) queries can be selected by a user or automatically by the computer (by eliminating keywords typically from right to left). The objective being to provide a user with ready means for obtaining relevant information or controlling (narrowing) the validated blocks.

Depending on what query is satisfied, memory circuit 30 will store in a temporary memory section a preselected amount of the stream of information stored, i.e. the previous 1,000 bytes and the following 1,000 bytes of the information stored in the buffered portion. There are as many temporary memory sections as profiles. Depending on how important a particular profile is for a user, the amount of information and the storage time will be determined. Thus, more important information will tie up more memory resources for a longer time than not as important information.

Microprocessor 20 will maintain a real time clock, in a conventional way, and will compare all the relevant time periods to this reference. Temporary memory sections and profile memory sections for holding information will be filled and their contents maintained for a predetermined amount of time or a user will have the option of either preventing any more information from coming in or dynamically flushing out information on a first in, first out basis, or any other basis.

Radio broadcast circuit 50 includes receiver 52 and cooperative antenna assembly 54. Receiver 52 is tunable to commercial or approved bands whether AM or FM. Audio digitizer circuit 60 is connected to spacer 62 and microphone 64 to play and record audio. Also, circuit 60 is connected to circuit 50 for selectively recording transmissions of interest to the user. Processor 20 allocates temporary storage sections in RAM memory 32. A user can program RAM memory 32 and/or non-volatile PROM memory 34 to increase or decrease the size of this temporary storage section.

For ready access to the different profiles, hot keys $P_1$, $P_2$, and $P_3$ are incorporated in the preferred embodiment shown in FIG. 1.

PROFILE A

Query 1: Keyword $A_1$ and Keyword $A_2$

Query 2: Keyword $A_1$

PROFILE B

Query 1: Keyword $B_1$ and Keyword $B_2$

Query 2: Keyword $B_1$

PROFILE C

Query 1: Keyword $C_1$ and Keyword $C_2$

Query 2: Keyword $C_1$

Suitable synchronization software is also provided to keep the information in device 10 synchronized with the information in compatible software in a desktop or portable computer where a user has more resources. Synchronization programs such as those used by the Palm Computing, Corp., Gilroy, Calif. (WWW.USr.Com/palm) under the trademark Hot Synch. A user may program device 10 so that the synchronization takes effect by either having the device or computer control depending on selected mode. One of these modes may be to let the apparatus with the latest (most current) changes control or fix either device 10 or the computer control always.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An information management device, comprising:

A) first computer means for processing data and instructions and including display output means;

B) first storage means cooperatively connected to said first computer means for storing data and instructions, and including means for selectively programming said storage means to define at least one profile filter wherein said profile filter includes at least one query that comprises at least one keyword and said first storage means includes a temporary storage section for storing said digital output if it contains at least one of said keywords and said first storage means further including a buffered portion; and C) means for receiving a stream of information from an electromagnetic broadcast and means for decoding said broadcast and continuously providing a compatible digital output to said first computer means so that said digital output is stored for a predetermined amount of time at said buffered portion and said first computer means compares said stored digital output with said profile filter and if said profile filter is matched to proceed with the storage at said first storage means of a predetermined amount of said stored digital output and displaying same with said display output means.

2. The device set forth in claim 1 further including:

D) input means for entering data and instructions to said first computer means.

3. The device set forth in claim 2 further including:

E) audio digitizing means connected to said first computer means and including a microphone and a speaker so that audio can be reproduced from data stored in said first storage means and audio can be stored as data in said first storage means.

4. The device set forth in claim 3 wherein said means for receiving a stream of information includes a paging device.

5. The device set forth in claim 4 wherein said input means includes a keyboard.

6. The device set forth in claim 5 wherein said first storage means includes personal information manager software.

7. The device set forth in claim 6 further includes acoustic telephone dialing means connected to said first computer means.

8. The device set forth in claim 1 further including:

F) second computer means for processing data and instructions and being selectably connected to said device, and said second computer means further including second storage means.

9. The device set forth in claim 8 wherein said first and second storage means include software means for synchronization the data and instructions contained therein.

* * * * *